350-96.27 SR

3/3/87 XR 4,647,811

United States Patent [19]

Galves et al.

[11] Patent Number: 4,647,811

[45] Date of Patent: Mar. 3, 1987

[54] IMAGE INTENSIFIER TUBE TARGET AND IMAGE INTENSIFIER TUBE WITH A VIDEO OUTPUT PROVIDED WITH SUCH A TARGET

[75] Inventors: Jean-Pierre Galves; Daniel Gibilini; Henri Rougeot, all of Paris, France

[73] Assignee: Thomson - CSF, Paris, France

[21] Appl. No.: 693,058

[22] Filed: Jan. 22, 1985

Related U.S. Application Data

[63] Continuation of Ser. No. 360,776, Mar. 22, 1982, abandoned.

[30] Foreign Application Priority Data

Mar. 27, 1981 [FR] France ................................ 81 06187

[51] Int. Cl.⁴ ........................ H01J 31/26; G02B 23/26

[52] U.S. Cl. ................................ 313/372; 350/96.27; 313/475

[58] Field of Search ........... 313/475, 103 R, 103 CM, 313/332-336, 372, 388; 350/96.27, 96.32

[56] References Cited

U.S. PATENT DOCUMENTS

| | | | |
|---|---|---|---|
| 3,237,039 | 2/1966 | Fyler | 350/96.27 X |
| 3,243,642 | 3/1966 | Gebel | 313/103 CM X |
| 3,522,367 | 7/1970 | Jones et al. | 350/96.27 X |
| 3,712,986 | 1/1973 | Collings | 350/96.27 X |
| 4,029,965 | 6/1977 | Carlson et al. | 357/31 X |
| 4,264,408 | 4/1981 | Benham | 313/475 X |
| 4,346,326 | 8/1982 | Driard et al. | 313/527 X |

*Primary Examiner*—Palmer C. DeMeo
*Assistant Examiner*—Sandra L. O'Shea
*Attorney, Agent, or Firm*—Roland Plottel

[57] ABSTRACT

A variable gain R.I.I. target is obtained by using an optical fibre board, whose face on the R.I.I. side has blind holes containing two types of granular luminescent materials having different luminous efficiencies and which are separated by a barrier layer. The electron beam from the R.I.I. photocathode is subject to two different accelerating voltages, the lower accelerating voltage exciting the luminescent material with the lower luminous efficiency and the higher accelerating voltage exciting the luminescent material with the higher luminous efficiency. Application to image intensifier tubes, used more specifically in radiology and fluoroscopy.

6 Claims, 11 Drawing Figures

IMAGE INTENSIFIER TUBE TARGET AND IMAGE INTENSIFIER TUBE WITH A VIDEO OUTPUT PROVIDED WITH SUCH A TARGET

This application is a continuation of application Ser. No. 360,776, filed Mar. 22, 1982, now abandoned.

BACKGROUND OF THE INVENTION

The present invention relates to an image intensifier tube target and also to image intensifier tubes having a video output provided with such a target.

The following description essentially relates to radiological image intensifier tubes, known as R.I.I. However, it is obvious that the invention also applies to luminous image intensifier tubes and to scintiscanning image intensifier tubes ($\gamma$ radiation).

In the case of R.I.I. tubes, it is desirable to have variable gain targets, whose gain, i.e. the number of photons emitted for each electron received by the target, can be multiplied by a factor of about 100. Thus, if desired, the R.I.I. can operate in radiography or in fluoroscopy.

In radiography the R.I.I. video output signal makes it possible to display on a television screen the information contained in the X-ray beam reaching the R.I.I. and the television picture is recorded on film or photograph. A high X-ray dose must be transmitted during the short exposure time to obtain a good signal-to-noise ratio. To prevent saturation, it is necessary to have a low gain target.

In fluoroscopy, the television screen is directly observed and a low X-ray dose is transmitted during the relatively long observation time. It is then necessary to have a high gain target to obtain a good image. U.S. Pat. No. 4,029,965, discloses an R.I.I. target with a video output and which has a variable gain. It is in fact a silicon target, one of whose faces is covered with a luminescent coating, itself covered with a metallic barrier layer, as an entering layer.

The electron beam from the R.I.I. cathode reaches the metallic barrier layer, which slows it down and only permits the passage of the higher energy electrons. In the luminescent coating, these electrons bring about the formation of photons, which produce charge carriers in the silicon of the target. These charge carriers discharge reverse-polarized diodes located on the other face of the target. Finally, the charge distribution on the other face of the target is scanned by the electron beam of a camera tube, which supplies the video signal.

The gain variation of the target is obtained by varying the accelerating voltage of the R.I.I. beam and by using the non-linear relationship which exists for metallic barrier layers between the penetration of the electrons into the barrier layer and the accelerating voltage of the electron beam.

However, this prior art variable gain target has the disadvantages that the resolution of the R.I.I. is reduced through the use of two layers covering the silicon target, namely the metallic barrier layer and the luminescent coating, whilst the presence of a metallic barrier layer introduces noise and leads to defects in the image obtained, as is indicated in U.S. Pat. No. 4,029,965.

BRIEF SUMMARY OF THE INVENTION

The present invention relates to a variable gain target which eliminates the aforementioned disadvantages.

The present invention relates to an image intensifier tube target, in which the tube has means making it possible to subject the electron beam coming from its photocathode to two different accelerating voltages.

The target according to the invention incorporates two types of luminescent material, with different luminous efficiencies and which receive the impact of the electron beam. Means ensure the excitation of only the luminescent material having the lower luminous efficiency by the electron beam subject to the lower accelerating voltage and ensure the excitation of the luminescent material with the higher luminous efficiency by the electron beam subJect to the higher accelerating voltage.

Thus, by passing from one accelerating voltage to the other, a target is provided, whose gain can be significantly varied by acting on the differing luminous efficiencies of the two luminescent materials forming the target. A metallic barrier layer as an entering layer, causing noise and image defects is no longer used.

According to a preferred embodiment of the invention the two luminescent materials of the target emit light having different wavelengths and the target has a matched optical filter, which transmits to a greater extent the light emitted by the luminescent material with the high luminous efficiency than that emitted by the other luminescent material.

Thus, a target is obtained, whose gain can be multiplied by a factor of about 100.

Finally, according to another preferred embodiment of the invention, the two luminescent materials are carried by an optical fibre board and a better resolution is obtained than in the prior art where the target is made from silicon, covered with a luminescent coating and a metallic barrier layer.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
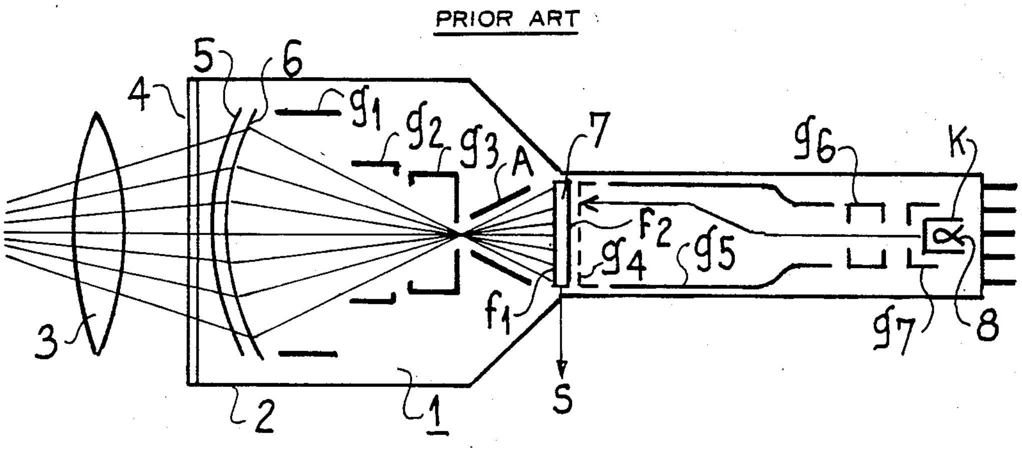
FIG 1 PRIOR ART
FIG. 1 the diagram of an R.I.I. with a video output according to the prior art.

In the drawings, the same references designate the same components but, for reasons of clarity, the dimensions and proportions of the various members have not been respected.

FIG. 1 shows the diagram of an R.I.I. with a video output and designated overall by reference numeral 1. From left to right in the drawing, there is firstly the R.I.I., then the picture tube, both of which are contained in the same vacuum enclosure 2. After passing through the body 3 under observation, an X-ray beam enters the R.I.I through a window 4.

The R.I.I comprises an input screen constituted by a scintillator 5 and a photocathode 6 ensuring the conversion of X-rays into luminous photons and then into photo electrons; an electronic optical system constituted by grids $g_1$, $g_2$ and $g_3$ ensuring the focusing of the electrons and exposing them to an accelerating voltage; a conical anode A; and a target 7 receiving the impact of the electron beam on its face $f_1$.

The other face $f_2$ of target 7 is scanned line-by-line by an electron beam produced by cathode K heated by a filament 8 of the picture tube. This electron beam is focused and accelerated by grids $g_4$ to $g_7$. Not shown coils bring about the concentration and deflection of the beam. The output video signal S is collected on target 7.

Figure 2:
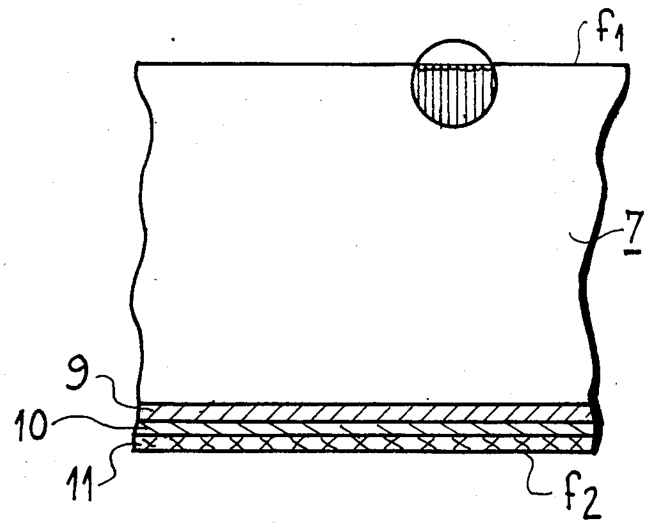
FIG. 2 the diagram of an embodiment of a target according to the invention.

FIG. 2 shows the diagram of an embodiment of a target according to the invention. This target is constituted by an e.g. 2 to 5 mm long optical fibre board.

Figure 3:
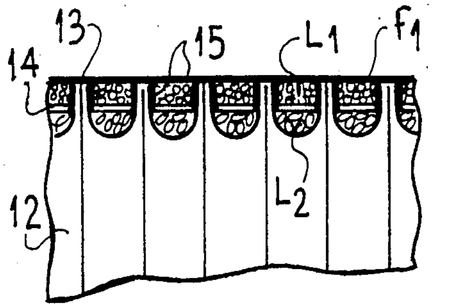
FIGS. 3 and 6 to 8 are diagrams showing in a more detailed manner than in FIG. 2, several embodiments according to the invention of the face of the target receiving the electron beam from the R.I.I.

Face $f_1$ of this target, i.e. that placed on the R.I.I. side, is shown in greater detail in FIG. 3. In FIG. 3, it can be seen that each optical fibre of the board has a blind hole obtained by removing over a depth of e.g. 5 $\mu$m the core of fibres 12 without touching their covering 13. For example, this can be brought about by selective chemical etching of the two glasses forming the core and the covering. In this way, blind holes with a depth of e.g. 5 $\mu$m and a diameter of e.g. 5 $\mu$m, are obtained, which are separated by walls of e.g. 2 $\mu$m.

Within each hole is firstly deposited a granular layer of luminescent material $L_2$ with a higher luminous efficiency $r_2$, then a transparent barrier layer 14 (this barrier layer is more fully described in U.S. Pat. No. 4,029,965) and another granular layer of luminescent material $L_1$, but having a lower luminous efficiency $r_1$.

Before filling the holes in the manner indicated hereinbefore, the side walls of each hole is covered with a thin metallic reflecting coating 15. This generally consists of aluminium, which has been vacuum evaporated and has an adapted incidence. When the holes are filled, layer $L_1$ is also covered with a thin metallic reflecting coating 15.

The R.I.I. comprises manual or automatic switching device having means making it possible to subject the electron beams from the photocathode thereof to two different accelerating voltages $V_1$ and $V_2$, equal e.g. to 10 and 30 kV.

The thickness of the luminescent materials $L_1$, $L_2$ and the barrier layer 14 of FIG. 3 are chosen in such a way that only the luminescent material $L_1$ with the lower luminous efficiency is excited by the electron beam subject to the lower accelerating voltage $V_1$ and so that the luminescent material $L_2$ with the higher luminous efficiency is mainly excited by the electron beam subject to the higher accelerating voltage $V_2$.

Other means making it possible to achieve this result will be described hereinafter. They differ from the indicated means, e.g. in the absence of the barrier layer or due to the fact that the luminescent materials are not granular and are instead in the form of a transparent thin layer, obtained by the vacuum evaporation of their constituent material.

Figure 4:
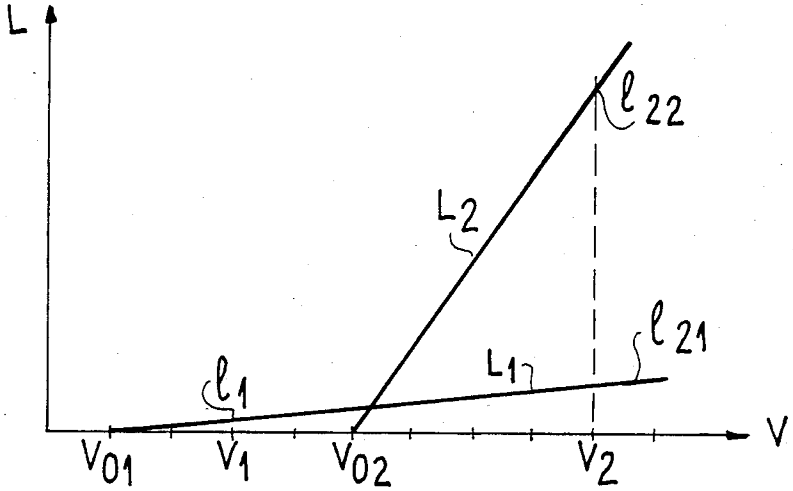
FIG. 4 the variation in the luminance as a function of the accelerating voltage for luminescent materials $L_1$ and $L_2$.

FIG. 4 shows the variations of the luminance L as a function of the accelerating voltage for materials $L_1$ and $L_2$. As the current density of the incident beam is constant, the luminance increases with the accelerating voltage as from a threshold value $V_{01}$ for $L_1$ and $V_{02}$ for $L_2$ and the rise is faster for $L_2$ than for $L_1$.

When an electron beam from the photocathode of the R.I.I. tube reaches face $f_1$ of target 7, it passes through the metallic coating 15 and then enters the first layer of luminescent material $L_1$.

If this beam is exposed to the lower accelerating voltage $V_1$ part, e.g. 50%, of the electrons of the beam does not pass beyond layer $L_1$ and the other 50% does not pass beyond the barrier layer.

The excitation of layer $L_1$ produces a relatively small quantity of light, due to the low luminous efficiency of said layer. The outer surface of layer $L_1$ and the walls of each blind hole are covered with the thin metallic coating 15, so that the light emitted by layer $L_1$ of each fibre propagates along the fibre towards face $f_2$ of target 7. There is no diffusion of the light and the same resolution as that of the fibre board is retained.

If the beam is subject to the higher accelerating voltage $V_2$, part e.g. 15%, of the electrons of the beam does not pass beyond layer $L_1$, another part e.g. 35%, does not pass beyond the barrier layer and the remainder excites the layer $L_2$ with the higher luminous efficiency.

It is readily apparent that for accelerating voltage $V_2$, the emitted light quantity is well above that emitted for accelerating voltage $V_1$, for $V_1 = 10$ kV and $V_2 = 30$ kV and with a relationship of the luminous efficiencies $r_2/r_1$ of approximately 5, a gain is obtained, which can be multiplied by a ratio of about 20.

It is possible to otain a variable gain which can be multiplied by a ratio of about 100 by using luminescent materials $L_1$ and $L_2$, which emit light of different wavelengths $\lambda_1$ and $\lambda_2$, e.g. red and green, and by using a matched optical filter transmitting to a greater extent the light emitted by the luminescent material $L_2$ with the higher luminous efficiency than that emitted by the other luminescent material $L_1$.

The granular luminescent material L emitting red light can be constituted e.g. by europium-doped yttrium oxysulphide or europium-doped yttrium oxide with a grain size below 1 $\mu$m. The granular luminescent material $L_2$ emitting green light can be constituted e.g. by silver-doped cadmium zinc sulphide of grain size below 2 $\mu$m. Layer $L_1$ is a monolayer having a thickness below 1 $\mu$m and layer $L_2$ has a thickness of e.g. 4 $\mu$m.

Figure 5:
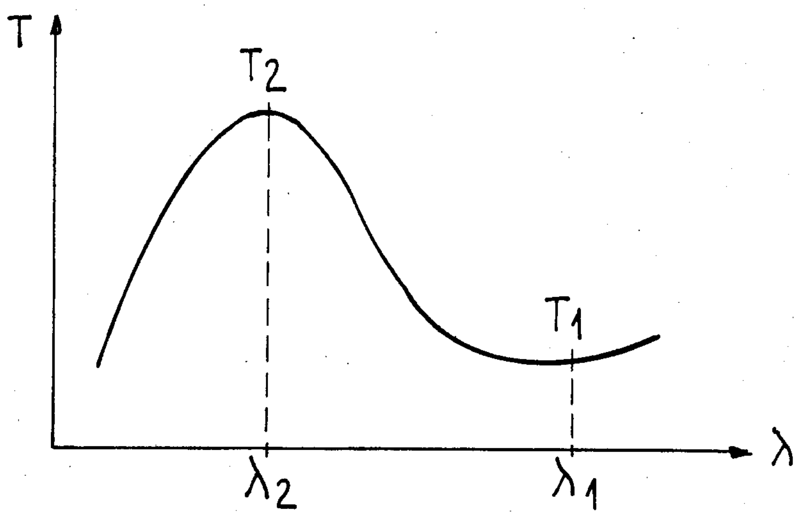
FIG. 5 variations of the transmission coefficient of the optical filter 10 as a function of the wavelength.

FIG. 5 shows the variations of the transmission coefficient T of such a matched optical filter as a function of wavelength $\lambda$.

The transmission coefficient $T_1$ of the filter is matched for $\lambda_1$ and transmission coefficient $T_2$ of the filter is matched for $\lambda_2$, in order to obtain a gain multiplied by a ratio of 100, or even higher if necessary.

The light emitted by the luminescent materials $L_1$ and $L_2$ propagates along the optical fibres up to the opposite face $f_2$ of target 7, whose structure can be examined in FIG. 2.

Face $f_2$ of target 7 is covered with a thin transparent conductive coating 9 obtained by vacuum evaporation. This coating can be constituted by tin oxide $SnO_2$, indium oxide $In_2O_3$, cadmium oxide $CdO_3$, manganese oxide $MnO$ or mixtures of these oxides. To obtain a gain which is multiplied by 100, coating 9 is covered by the matched optical filter 10.

The latter can be obtained by evaporating a material in the form of a very thin coating of less than 1 micron and by influencing the thickness of the coating in order to modify the transmission in per se known manner. For example, it is possible to evaporate lutetium diphthalocyanide.

A conventional picture tube photosensitive target 11 is deposited on filter 10 and can be constituted by a continuous photoconductive layer or reverse-polarized diodes. This photoconductive layer can be of antimony sulphide, amorphous selenium, an amorphous compound of selenium telluride, sulphur and arsenic, or even a lead oxide layer.

This target is read line-by-line by the electron beam of the picture tube.

It is obvious that if it is only necessary to obtain a gain, which can be multiplied by a ratio of about 20, it is possible to use luminescent materials emitting light of the same wavelength and then the matched optical filter is rendered superfluous.

Figure 11:
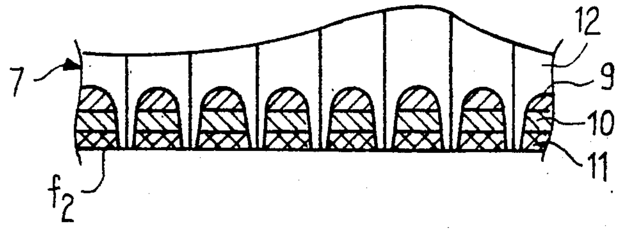
FIG. 11 is a diagram showing in a more detailed manner than in FIG. 2, another embodiment of the opposite face of the target.

According to another embodiment of the invention, as shown in FIG. 11 face $f_2$ of the board can, in the same way as face $f_1$, have blind holes filled with three layers 9, 10 and 11.

Figure 6:
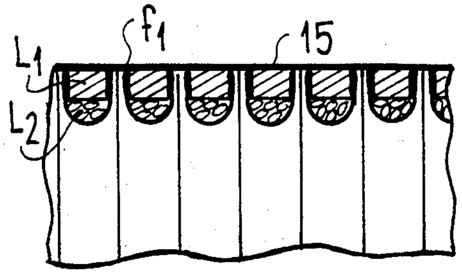
Figure 7:
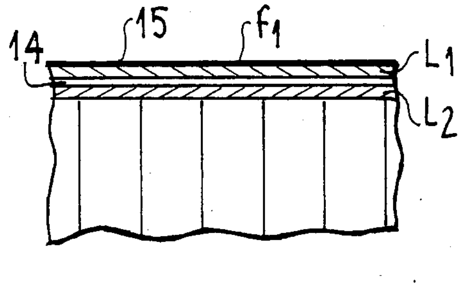
Figure 8:
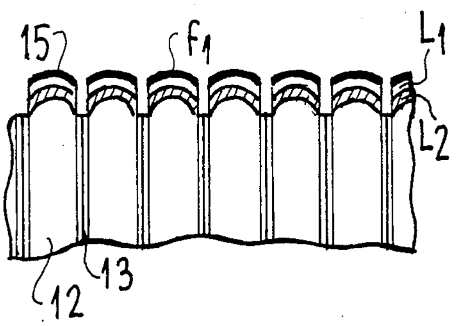

FIGS. 6, 7 and 8 show other embodiments of the target face $f_1$ and in all of these the target is constituted by an optical fibre board.

In FIG. 6, as in FIG. 3, each fibre has a blind hole. Within each hole is firstly deposited a granular luminescent material layer $L_2$ having a high luminous efficiency $r_2$, followed by an evaporated layer $L_1$ of luminescent material having a low luminous efficiency $r_1$.

Evaporated layer $L_1$ can be chosen in such a way that there is no need for a barrier layer inserted between layers $L_1$ and $L_2$. In addition, the lower accelerating voltage $V_1$ only brings about the excitation of layer $L_1$ and the higher accelerating voltage $V_2$ brings about the excitation of layer $L_2$.

Evaporated layer $L_1$ can also be given a sufficiently low luminous efficiency to obtain a gain which is multiplied by about 100 on passing from $V_1$ to $V_2$ and without their being any need for a matched optical filter.

As in the case of FIG. 3, for retaining the resolution of the optical fibre board, the side walls of the blind holes and the outer surface of layer $L_1$ are covered with a thin metallic coating 15.

FIG. 7 shows an embodiment of the target face $f_1$ in which the surface of the board is covered with two evaporated layers $L_1$ and $L_2$ of luminescent material having different luminous efficiencies. A barrier layer 14, also obtained by vacuum evaporation, can if necessary be placed between layers $L_1$ and $L_2$. A thin metallic coating 15 covers the outer surface of the low luminous efficiency layer $L_1$.

The use of thin coatings or layers $L_1$, $L_2$ and 15 obtained by the vacuum evaporation of their constituent materials, makes it possible to obtain a target having a good resolution without it being necessary to hollow out the fibres.

In the embodiment of the target face $f_1$ shown in FIG. 8, the fibre core 12 projects from the surface of the board. For example, this can be obtained by selective chemical etching of the two glasses forming the core and the covering, as was the case for obtaining the blind holes in FIGS. 3 and 6, but in those cases it was a question of removing the fibre covering.

As in the case of FIG. 7, onto the surface of each core is deposited two evaporated layers $L_1$ and $L_2$ of luminescent material having different luminous efficiencies. A thin metallic coating 15 covers layer $L_1$ and, if necessary, an evaporated barrier layer can be used.

Layer $L_1$ can be constituted by europium-doped yttrium oxysulphide or oxide and layer $L_2$ can be constituted by terbium-doped yttrium oxysulphide. These two layers are deposited in a conventional manner using an electron gun.

According to another embodiment of the invention, which is not shown in the drawings, the target is formed by an, e.g. silicon, semiconductor substrate and not by an optical fibre board. The silicon surface is then covered with two layers $L_1$ and $L_2$, which are preferably evaporated layers of luminescent material and not granular luminescent material, in order to improve the resolution.

According to another embodiment of the invention, two superimposed luminescent material layers, optionally separated by a barrier layer, are no longer used. Instead, two types of granular luminescent materials are used having different light efficiencies, but the grains of the two materials are mixed, the grains of one of the materials being covered with a barrier layer.

Figure 9:
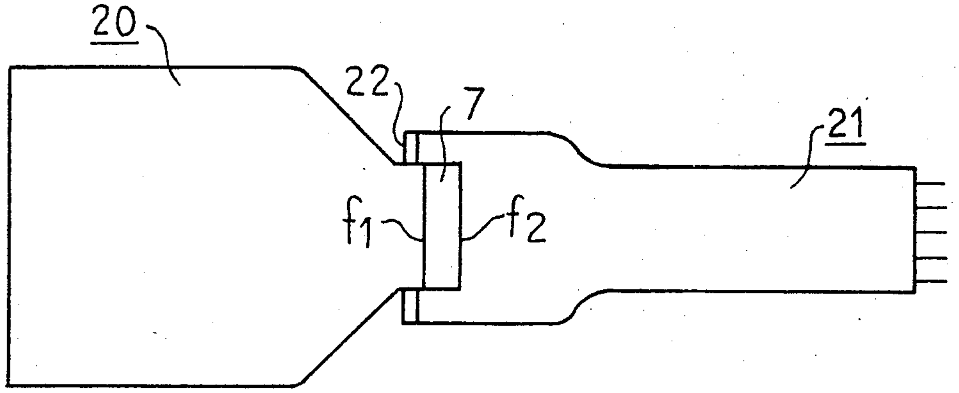
FIGS. 9 and 10 two embodiments of an R.I.I. with video output incorporating a target according to the invention.
Figure 10:
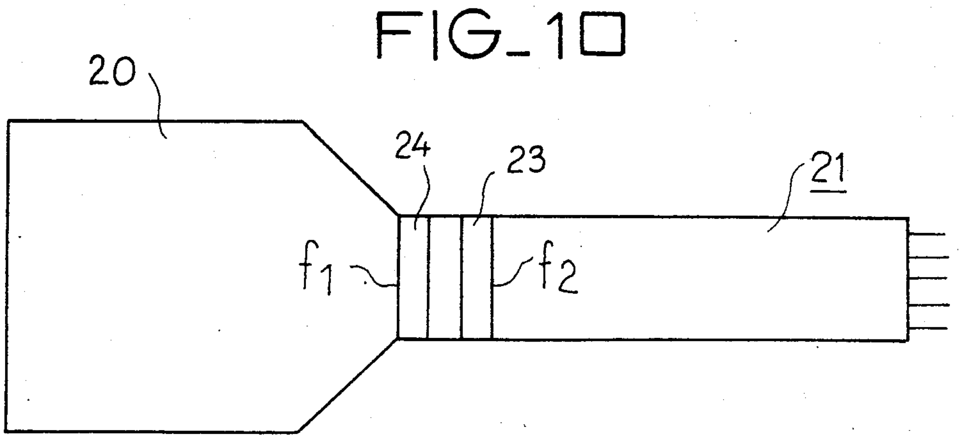

FIGS. 9 and 10 show two embodiments of an R.I.I. with a video output incorporating a target according to the invention. Unlike in the embodiment of FIG. 1, the R.I.I. tube 20 and the picture tube 21 are located in two separate vacuum enclosures.

In FIG. 9, the R.I.I. tube has a target 7 like that shown in FIG. 2 and which is constituted by an optical fibre board, whose faces $f_1$ and $f_2$ are covered with several layers $L_1$, $L_2$, 15 and 9, 10, 11.

The picture tube enclosure is fixed to the R.I.I. tube enclosure by means of a collar 22, e.g. in a pyroceramic seal. As a result, it is no longer necessary to expose the picture tube to the high temperatures required for producing the R.I.I. In addition, it is possible to test the operation of the R.I.I. before adapting or matching the picture tube.

In FIG. 10, R.I.I. tube 20 and picture tube 21 are joined by two separate optical fibre boards 24 and 23.

According to a preferred embodiment of the invention, R.I.I. board 24 carries on its left-hand side face $f_1$ layers $L_1$, $L_2$ and 15, as is shown e.g. in FIGS. 3 and 6 to 8, whilst picture tube board 23 carries on its right-hand side face $f_2$ layers 9, 10 and 11.

What is claimed is:

1. A variable gain image intensifier comprising a radiological image intensifier tube including a photocathode for producing a first electron beam in response to x-rays acting thereon, means for focusing said first electron beam on to an electron beam receiving target, means for accelerating the electron beam either at a first high voltage or at a second low voltage, said target comprising an optical fibre board having a first face for receiving said first electron beam and a second face opposite to said first face for receiving a scanning electron beam, said target further comprising first and second luminescent materials arranged within the fibers of said board proximate to said first face thereof for receiving said first electron beam and creating light for travel from proximate said first face through said optical fibre board to said second face, said first and second luminescent materials having higher and lower luminous efficiencies respectively, said luminscent materials being arranged so that the luminescent material having the lower luminous efficiency is excited when the first electron beam acting thereon is subjected to the lower of said two accelerating voltages, and the luminescent material having the higher luminous efficiency is excited when said first electron beam acting thereon is subjected to the higher of the two accelerating voltages.

2. An image intensifier as in claim 1 in which the material of lower luminous efficiency is closer to the first face than the material of higher luminous efficiency.

3. An image intensifier as in claim 2 in which a barrier layer is interposed between the two luminescent materials for impeding passage therepast of electrons subjected to the lower accelerating voltage.

4. An image intensifier as in claim 1 in which the second face of the target includes a photosensitive material for receiving the light which has traversed the optical fibre board.

5. An image intensifier as in claim 4 in which the two luminescent materials emit at different wavelengths and an optical filter underlying the photosensitive material which selectively attenuates the light from the material of lower luminous efficiency before it is incident on the photosensitive material.

6. A variable gain image intensifier tube target comprising an optical fibre board having a first face for receiving a first electron beam that alternately has two different accelerating energies, and a second face opposite to said first face for receiving a scanning electron beam, said target further comprising first and second luminescent material arranged proximate to said first face for receiving said first electron beam, said first and second luminescent materials having higher and lower luminous efficiencies respectively, said luminescent material having the lower luminous efficiency is excited when the first electron beam acting thereon has the lower of said two energies and the luminescent material having the higher luminous efficiency is excited where said first electron beam acting thereon has the higher of the two energies.

* * * * *